(12) United States Patent
Moriya et al.

(10) Patent No.: US 9,031,935 B2
(45) Date of Patent: May 12, 2015

(54) SEARCH SYSTEM, SEARCH METHOD, AND PROGRAM

(75) Inventors: Yutaka Moriya, Tokyo (JP); Fumihiko Terui, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 13/124,822

(22) PCT Filed: Oct. 16, 2009

(86) PCT No.: PCT/JP2009/067929
§ 371 (c)(1),
(2), (4) Date: Jul. 7, 2011

(87) PCT Pub. No.: WO2010/047286
PCT Pub. Date: Apr. 29, 2010

(65) Prior Publication Data
US 2011/0302166 A1    Dec. 8, 2011

(30) Foreign Application Priority Data
Oct. 20, 2008    (JP) ................................. 2008-270028

(51) Int. Cl.
G06F 17/30    (2006.01)
G06F 7/00    (2006.01)

(52) U.S. Cl.
CPC ................................ *G06F 17/30657* (2013.01)

(58) Field of Classification Search
None
See application file for complete search history.

(56) References Cited

U.S. PATENT DOCUMENTS

| | | | |
|---|---|---|---|
| 6,230,155 B1 | 5/2001 | Broder et al. | |
| 6,615,209 B1 | 9/2003 | Gomes et al. | |
| 6,658,423 B1 | 12/2003 | Pugh et al. | |
| 6,910,037 B2 * | 6/2005 | Gutta et al. | 707/730 |
| 6,978,419 B1 | 12/2005 | Kantrowitz | |

(Continued)

FOREIGN PATENT DOCUMENTS

| | | |
|---|---|---|
| JP | 07295970 | 11/1995 |
| JP | 07295994 | 11/1995 |

(Continued)

OTHER PUBLICATIONS

English Translation of International Preliminary Report, May 17, 2011, for PCT/JP2009/067929, Total 5 pp.

(Continued)

*Primary Examiner* — Alicia Willoughby
(74) *Attorney, Agent, or Firm* — Janaki K. Davda; Konrad, Raynes, Davda & Victor LLP

(57) ABSTRACT

Provided is a search system and a search method to find a document among documents of a search result. This search system includes a division unit that divides a document to be searched into a plurality of blocks in accordance with designated division information, a calculation unit that calculates a hash value of each block by applying a hash function to a character string included in each block, a storage unit that stores the calculated hash value together with positional information on the block in the document, and a document grouping unit that fetches, for each document obtained by searching based on the search word, a corresponding hash value from the storage unit in accordance with positional information on a block including the search word to group documents having the same hash value into one group and output the grouped documents as the search result.

21 Claims, 13 Drawing Sheets

```
SEARCH RESULT
   DOCUMENT 1
     DOCUMENT 3
     DOCUMENT 4
   DOCUMENT 2
     DOCUMENT 5
       ...
       ...
       ...
   DOCUMENT 20
```

(56) References Cited

U.S. PATENT DOCUMENTS

| | | | |
|---|---|---|---|
| 7,523,098 B2* | 4/2009 | Hirsch et al. | 1/1 |
| 7,814,078 B1* | 10/2010 | Forman et al. | 707/698 |
| 2003/0120647 A1* | 6/2003 | Aiken et al. | 707/3 |
| 2005/0165747 A1* | 7/2005 | Bargeron et al. | 707/3 |
| 2007/0260450 A1* | 11/2007 | Sun | 704/9 |
| 2008/0235215 A1* | 9/2008 | Suzuki | 707/5 |
| 2008/0270436 A1* | 10/2008 | Fineberg et al. | 707/101 |
| 2010/0095129 A1* | 4/2010 | Wilson | 713/187 |
| 2010/0169299 A1* | 7/2010 | Pollara | 707/708 |
| 2010/0195909 A1* | 8/2010 | Wasson et al. | 382/176 |

FOREIGN PATENT DOCUMENTS

| | | |
|---|---|---|
| JP | 2001167096 | 6/2001 |
| JP | 2003141027 | 5/2003 |
| JP | 2005173889 | 6/2005 |
| JP | 2006285499 | 10/2006 |
| JP | 2008015774 A | 1/2008 |

OTHER PUBLICATIONS

English Translation of Written Opinion, May 13, 2011, for PCT/JP2009/067929, Total 4 pp.

English Abstract and Machine Translation for JP07295970, published on Nov. 10, 1995, Total 50 pp.

English Abstract and Machine Translation for JP07295994, published on Nov. 10, 1995, Total 43 pp.

English Abstract and Machine Translation for JP2001167096, published on Jun. 22, 2001, Total 23 pp.

English Abstract and Machine Translation for JP2003141027, published on May 16, 2003, Total 52 pp.

English Abstract and Machine Translation for JP2005173889, published on Jun. 30, 2005, Total 52 pp.

English Abstract and Machine Translation for JP2006-285499, published on Oct. 19, 2006, Total 26 pp.

International Search Report for International Application No. PCT/JP2009/067929, Nov. 17, 2009, Total 2 pp.

Bernstein, Y. and J. Zobel, "Redundant Documents and Search Effectiveness", Proceedings of the 14th ACM International Conference on Information and Knowledge Management, CIKM'05, Jan. 2005, Total 8 pp.

English Abstract and Machine Translation for JP2008015774A, published on Jan. 24, 2008, Total 32 pp.

Extended European Search Report, Nov. 27, 2012, for JP920080225EP1, Total 8 pp.

IDS Report, Nov. 21, 2012, from the Oct. 23, 2012 Notice of Allowance for JP920080225JP2, Total 2 pp.

* cited by examiner

FIG. 1A

DOCUMENT 1

A source code of PHP is attached.

Thanks in advance.

------

Suzuki

Example Corp Japan

XXX@example.co.jp

FIG. 1B

DOCUMENT 2

An addition to the previous one is attached.

Thanks in advance.

------

Suzuki

Example Corp Japan

XXX@example.co.jp

FIG. 1C

DOCUMENT 3

This is the code sent from Suzuki-san.

------

Tanaka

Example Corp Japan

YYY@example.co.jp

| WORD | DOCUMENT |
|---|---|
| PHP | 1 |
| Suzuki | 1,2,3 |
| code | 1,3 |
| ... | ... |

DOCUMENT 1

A source code of PHP is attached.

Thanks in advance.

------

Suzuki
Example Corp Japan
XXX@example.co.jp

→ A source code of PHP is attached.

Thanks in advance.

→ ------

Suzuki
Example Corp Japan
XXX@example.co.jp

FIG. 7A

DOCUMENT 2

An addition to the previous one is attached.

Thanks in advance.

------

Suzuki
Example Corp Japan
XXX@example.co.jp

→ An addition to the previous one is attached.

Thanks in advance.

→ ------

Suzuki
Example Corp Japan
XXX@example.co.jp

FIG. 7B

DOCUMENT 3

This is the code sent from Suzuki-san.

------

Tanaka
Example Corp Japan
YYY@example.co.jp

→ This is the code sent from Suzuki-san.

→ ------

Tanaka
Example Corp Japan
YYY@example.co.jp

FIG. 7C

| Date | Flags | FROM | TO | Subject |
|---|---|---|---|---|
| ☐ 8/31/07 5:25 PM | | aaa@bbb.co.jp | ccc@bbb.co.jp | code of PHP(view thread) |
| ...Suzuki   Example Corp Japan XXX@example.co.jp | | | | |
| ☐ 8/31/07 5:27 PM | | aaa@bbb.co.jp | ccc@bbb.co.jp | code of PHPpart 2(view thread) |
| ...Suzuki   Example Corp Japan XXX@example.co.jp | | | | |
| ☐ 8/31/07 5:30 PM | | aaa@bbb.co.jp | ccc@bbb.co.jp | code (view thread) |
| ...This is the code sent from Suzuki-san ------   Tanaka   Example Corp Japan YYY@example.co.jp | | | | |

FIG. 9A

| Date | Flags | FROM | TO | Subject |
|---|---|---|---|---|
| ☐ 8/31/07 5:25 PM | | aaa@bbb.co.jp | ccc@bbb.co.jp | code of PHP(view thread) |
| ...Suzuki   Example Corp Japan XXX@example.co.jp | | | | |
| ☐ 8/31/07 5:27 PM | | aaa@bbb.co.jp | ccc@bbb.co.jp | code of PHPpart 2(view thread) |
| | ...Suzuki   Example Corp Japan XXX@example.co.jp | | | | |
| ☐ 8/31/07 5:30 PM | | aaa@bbb.co.jp | ccc@bbb.co.jp | code (view thread) |
| ...This is the code sent from Suzuki-san ------   Tanaka   Example Corp Japan YYY@example.co.jp | | | | |

FIG. 9B

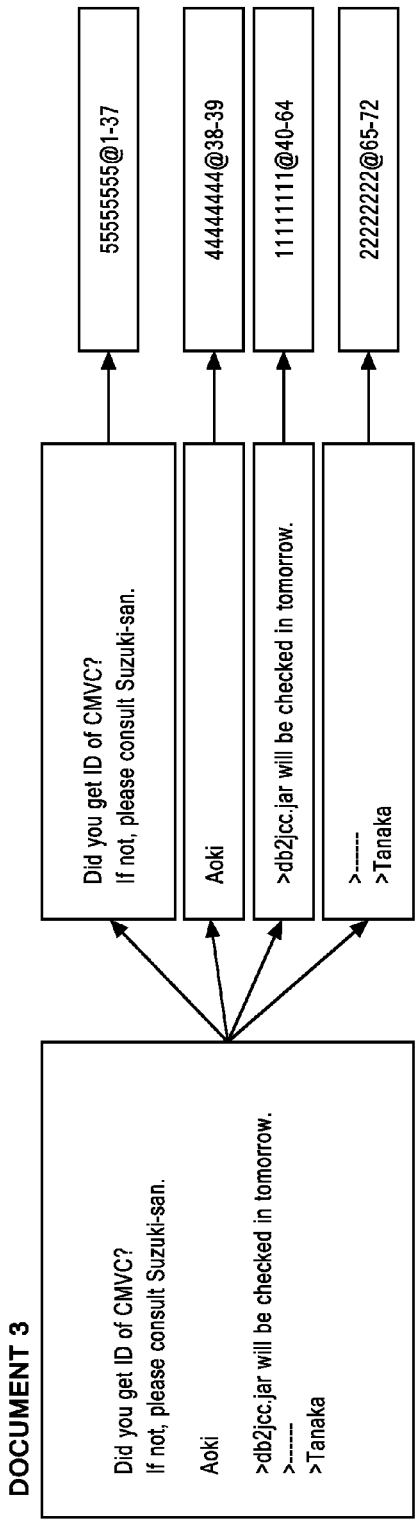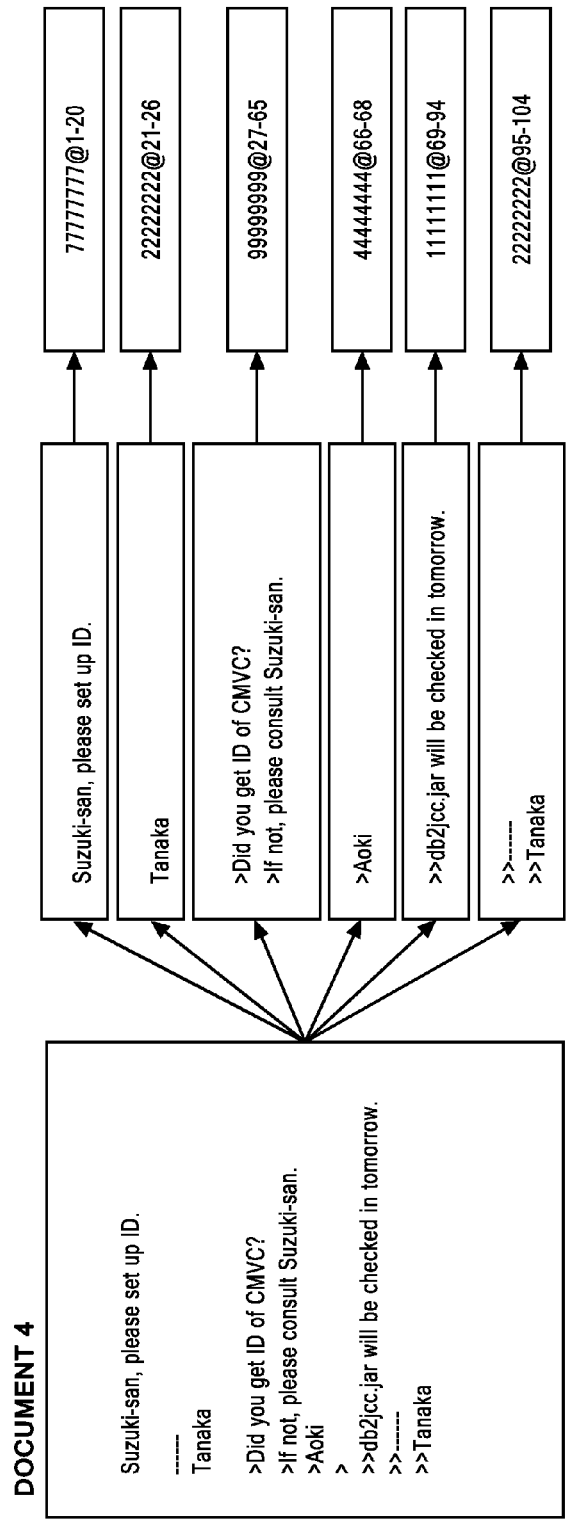
FIG. 10C
FIG. 10D

```
SEARCH RESULT
  DOCUMENT 1
    DOCUMENT 3
    DOCUMENT 4
  DOCUMENT 2
    DOCUMENT 5
      . . .
      . . .
      . . .
  DOCUMENT 20
```

FIG. 11A

DOCUMENT 1 db2jcc.jar will be checked in tomorrow.
------
Tanaka

DOCUMENT 3

Did you get ID of CMVC?
If not, please consult Suzuki-san.

Aoki

>db2jcc.jar will be checked in tomorrow.
>------
>Tanaka

DOCUMENT 4

Suzuki-san, please set up ID.
------
Tanaka

>Did you get ID of CMVC?
>If not, please consult Suzuki-san.
>Aoki
>
>>db2jcc.jar will be checked in tomorrow.
>>------
>>Tanaka

DOCUMENT 2

Here is a download site for db2jcc.jar.

Aoki

FIG. 11B

SEARCH SYSTEM, SEARCH METHOD, AND PROGRAM

FIELD OF THE INVENTION

The present invention relates to a search system capable of detecting, among a search result, which of the documents detected include overlapped contents, a search method therefor, and a computer readable program implementing the method.

BACKGROUND ART

A search engine is available as a system to search documents stored in a database connected with a network such as the Internet. Some of the search engines have a full-text search function to search a specific character string from a plurality of documents.

Such a full-text search engine equipped with the full-text search function is classified into a sequential search type and an index type, where the sequential search type search engine scans the contents of a plurality of documents one by one to search character strings. Whereas, when enormous number of documents have to be searched, thus taking a long time for the sequential search to make a search, the index type search engine creates beforehand an index with a table structure made up of a character string, a location of the document, an update time, an occurrence frequency and the like, and accesses the index at the time of the search, thus enabling a fast search.

The index used for the index type search engine has various formats, typically including an inverted index with a variable-length record made up of words and a document file ID including the words.

Referring now to FIGS. 1 and 2, three documents, an inverted index corresponding thereto, and a data structure to keep collected documents are exemplified in the following. The documents illustrated in FIGS. 1A to 1C have document file IDs of 1 to 3, respectively, which are all e-mail documents. FIG. 2A illustrates an inverted index made up of a word serving as a key and an ID including the word, where documents including the words of "PHP", "鈴木" ("Suzuki" in English), and "コード" ("code" in English) are associated therewith. FIG. 2B illustrates an entry example of a data structure to store the documents collected, where a word serving as a key and the contents of a document corresponding to the word are associated with each other. In FIG. 2B, the words are listed in the left column, and the document contents corresponding to the selected words are shown in the right column.

The full-text search engine returns, as a search result, a group of documents where a word matching with a search word appears. Such techniques of judging a similarity between documents as a whole are described in Patent Documents 1 to 3, for example.

These techniques do not consider what character string includes the word matching with the search word in the document. Therefore, when the search result includes a large number of documents, it is difficult to find out a document required truly without imposing a burden. For instance, when the search word exists in a template for document, all of the documents using the template will be returned, thus imposing a burden to find out a document as a true target including the search word in its main body from the search result. Herein, the template refers to a header or a footer of a document, a menu at a Web site, a signature of e-mail, or the like.

In the case of e-mail, reply mail or forwarded mail often includes a copy of their original mail at the end thereof. If the copy part includes a search word, then the returned search result will include the mail even when a main body of the mail does not include the search word. Such a case causes noise when a search has to be conducted for mail including the search word in its main body.

Therefore, if the documents including the search word in the same character string in their main bodies can be collected into one group, the number of the documents to be evaluated is reduced, thus making it easy to find out a document required truly.

For instance, a technique of detecting documents having overlapped contents with consideration given to occurrence positions of a search word has been proposed (see Patent Document 4), which extracts and compares character strings including the search keyword for each of the documents included in a search result detected.

FIG. 3 illustrates the configuration of a search engine described in Patent Document 4. The search engine 10 is connected with a data source 20 keeping documents to be searched, and is further connected with a client device 30 that outputs an inquiry (query) input by a user to acquire a search result.

The search engine 10 is provided with a database 11 that registers documents therein, and a crawler 12 that acquires documents on the data source 20 at regular intervals to create an index. The crawler 12 repeats an operation of requesting a copy of a document used for index creation, tracing a link included in the document, and collecting another document. When the crawler 12 finds a new document, the crawler 12 registers the new document in the database 11. When the crawler 12 finds that a document is no longer available, then crawler 12 deletes the document from the database 11.

The search engine 10 is provided with a parser 13 that extracts text from the document acquired by the crawler 12 and registered in the database 11, and extracts format information such as paragraph. The parser 13 performs syntactic analysis, and inputs the text and the format information extracted as a result of the syntax analysis to a data structure called a store 14 that stores collected documents.

The search engine 10 is provided with an indexer 15 that creates an index based on the text and the format information extracted by the parser 13. The indexer 15 associates a word serving as a key with an ID of a document including the word as described above, and stores the same in an index 16.

The search engine 10 is further provided with a search run time 17 serving as a search server that searches for a document including a search word as a key in response to a query including the search word received from the client device 30, a query-related information creation device 18 that receives a search result from the search run time 17, acquires a document including the search word from the store 14, and generates a character string including the search word, and a query-related information comparison device 19 that compares the generated character string with the documents in the search result.

The search engine 10 makes the query-related information creation device 18 generate character strings including the search word for each search and for each search result, and makes the query-related information comparison device 19 compare the character strings, thus detecting documents matching with each other as a whole, and documents including several sampled portions matching with each other as related documents.

[Patent Document 1] U.S. Pat. No. 6,230,155
[Patent Document 2] U.S. Pat. No. 6,658,423

[Patent Document 3] U.S. Pat. No. 6,978,419
[Patent Document 3] U.S. Pat. No. 6,615,209

The conventional search engines handle different documents having the same contents as individual search results, thus making it possible to exclude such documents having the same contents or similar contents beforehand at the time of the document collection or the index creation. However, the conventional search engines can only judge that documents or several portions thereof have the same contents or similar contents, but cannot judge that documents have the same contents or similar contents based on partial identity.

When a search word appears in a menu at a Web site, the conventional search engines return all pages including the menu. Although the returned pages can be limited by designating words and character strings that do not appear to be characteristics of a document beforehand, such words and character strings have to be known prior to the designation.

Further, the conventional search engines return a search result without consideration given to a relation between the documents. Therefore, a user is required to make a judgment as to whether all of the documents included in the returned search result are truly required documents or not one by one.

SUMMARY OF THE INVENTION

In order to cope with the above-stated problems, according to the present invention, text making up a document is divided into a plurality of blocks, blocks including a search word are noted, and among documents included in a search result, documents including such blocks with the same contents are grouped, so that documents with the same contents or with similar contents can be determined based on partial identity, and the search result with consideration given to a relationship between the documents can be returned.

More specifically, when an index is created, text in a document to be searched is divided into a plurality of blocks. A block may be a sentence, a paragraph or the like. A hash value is calculated for each of the thus obtained blocks. The hash value is a numerical value corresponding to a character string. This hash value is kept together with positional information of the block in the document in association with the document.

Then, when a search is executed, a hash value is fetched for each document in the search result in accordance with corresponding positional information representing a position of a block in which the search word appears, and documents having the same hash value are grouped and output.

In order to implement this, the present invention provides a search system including a division unit that divides a document to be searched into a plurality of blocks in accordance with designated division information, a calculation unit that calculates a hash value of each block by applying a hash function to a character string included in each block, a storage unit that stores the calculated hash value together with positional information on the block in the document, and a document grouping unit that fetches, for each document obtained by searching based on the search word, a corresponding hash value from the storage unit in accordance with positional information on a block including the search word to group documents having the same hash value into one group and output the grouped documents as the search result.

The division unit may divide the document at least one of into each sentence, into each paragraph, at a null line and based on additional information added to the document in accordance with the division information. The additional information may include a HTML tag in a HTML document. The division unit may divide a document using not only one type of division information but also a plurality of types of division information. For instance, when a specific search word is used, division information for each paragraph may be used, and when another search word other than the specific search word is used, division information for each sentence may be used. In this way, a plurality of types of division information used allows, when a user or a system judges that grouping using the division information for each sentence is not appropriate, to use the division information other than for each sentence, e.g., for each paragraph, for grouping.

The document includes a token string in which a plurality of words or tokens are sequentially ordered, and a character string included in each block includes at least one token. Therefore, the position of each block may be represented by the number of tokens. The positional information may include a token order from a leading token in the document to a leading token of each block. The positional information may further include a token order from the leading token in the document to an end token of each block. These two token numbers may be used as the range of the leading to the end of the token string making up the block.

Further, the position of each block may be represented by the number of characters as well. In this case, the positional information may include the number of characters from a leading character in the document to a leading character of a character string included in each block. The positional information may further include the number of characters from the leading character in the document to an end character of each block. These two character numbers may be used as the range of the leading to the end of the character string making up the block.

When a character string included in the block includes a designated character type, the calculation unit may calculate a hash value by applying a hash function to a character string from which the character type has been excluded. In e-mail, a mark ">" is often added when the received contents are quoted. Then, a hash value is calculated based on a character string from which this mark ">" has been excluded, whereby the documents having the same hash value can be grouped.

The document grouping unit may include a sort unit that sorts a plurality of documents included in a group in accordance with a search score. Thereby, the plurality of documents included in the group can be arranged in the order of search scores.

The present invention can also provide a search method performed by the above-stated search system. This method includes processing steps executed by the division unit, the calculation unit, the storage unit, and the document grouping unit.

This search method can be configured as a program and can be embodied by executing the program. This program can be stored in a recording medium for provision.

The search system, the search method, the program, and the recording medium of the present invention make it easy to find a document required truly from the search result, thus reducing trouble to search for the required document and shortening the search time.

BRIEF DESCRIPTION OF THE DRAWINGS

FIGS. 1A, 1B, and 1C illustrate three documents to be searched.

FIGS. 7A, 7B, and 7C illustrate three documents to be searched.

FIGS. 9A and 9B illustrate grouped documents as a search result.

FIGS. 10A, 10B, 10C, and 10D illustrate four examples of e-mail, each of which is divided into blocks, with a hash value and positional information being associated with each other.

FIGS. 11A and 11B illustrate an exemplary search result subjected to grouping.

BEST MODE FOR CARRYING OUT THE INVENTION

The following describes the present invention by way of specific embodiments, which do not intend to limit the present invention to the following embodiments.

Figure 4:
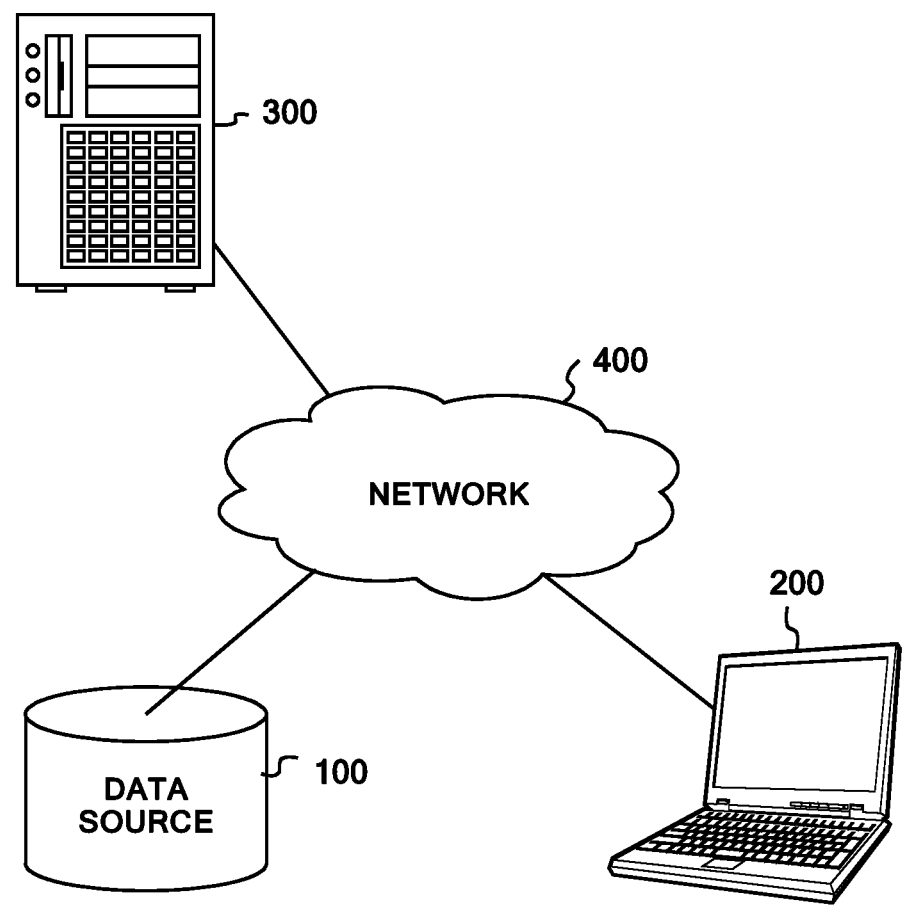
FIG. 4 exemplifies a network system including a data source keeping documents to be searched, a client device that issues a search request, and a server device including a search engine that receives the search request and performs a search processing.

FIG. 4 exemplifies a network system including a data source keeping documents to be searched, a client device that issues a search request, and a server device including a search engine that receives the search request and performs a search processing. This drawing illustrates only one data source 100, client device 200, and server device 300. However, two or more these devices may be connected with the network 400. The data source 100 and the server device 300 may be directly connected.

The data source 100 may be any device that can keep documents, which may be a database that collects data for each item and manages the same or another server device. The data source 100 may be a PC, for example, that keeps documents and is used by another user.

When the data source 100 is a database, a relational database can be used for the database, which includes a plurality of relations as a basic data type, where an inquiry to acquire stored data is made using relational operators such as an equal sign and an inequality sign and logical operators such as logical product, logical sum, and negation. The database may be directly constructed on a file system provided by an operating system (OS) or may be constructed using a database management system (DBMS).

The client device 200 may be any device that can output a search request, which may be a PC equipped with an application capable of generating a search request from search words input by a user and making an inquiry via the network. This PC is equipped with a keyboard to allow the user to input search words, a mouse to designate an input position and give an instruction to start a search, a display device that displays an input screen and a search result, a network I/F for connection with the network, a HDD that stores applications, a RAM on which the applications are read out for execution, a CPU executing the applications, and the like. In addition to the applications, a Web browser may be used to enable communication via the network.

The server device 300 may also have a hardware configuration similar to that of the client device 200, which is equipped with a Web server for communication with a Web browser, and a search engine for processing a search request received from the client device 200.

Figure 5:
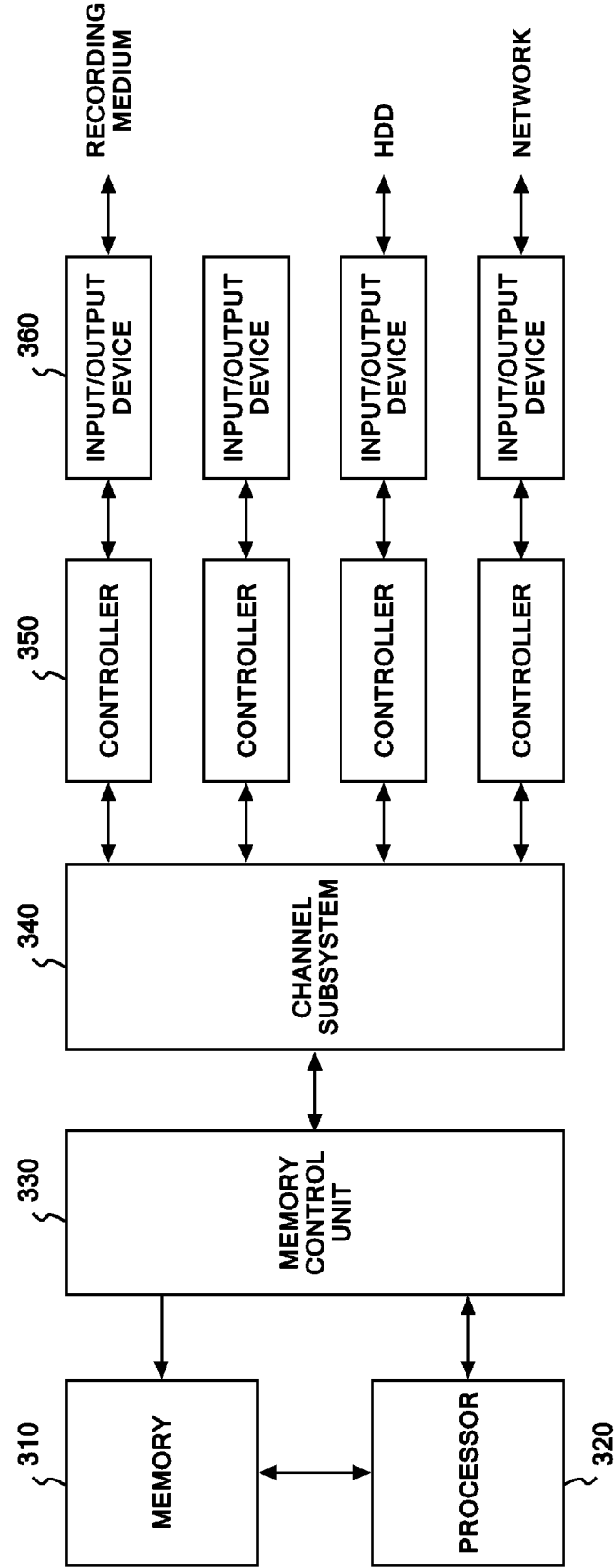
FIG. 5 illustrates an exemplary hardware configuration of a search device.

The server device 300 may have a hardware configuration similar to that of the client device 200 as described above. Referring now to FIG. 5, a hardware configuration of the server device 300 is exemplified briefly in the following. In the hardware configuration of FIG. 5, the server device 300 is provided with a memory 310, at least one processor 320, a memory control unit 330, a channel subsystem 340, at least one controller 350, and at least one input/output device 360.

The memory 310 stores data and programs input through the input/output device 360, and sends, in response to address designation by the processor 320 or the channel subsystem 340, data or the like stored at the address to the processor 320 or the channel subsystem 340.

The processor 320 controls the overall apparatus, and runs at least one OS. The OS controls execution of a program and input/output processing in the apparatus. The memory control unit 330 is connected with the memory 310, the processor 320, and the channel subsystem 340 via a bus. This memory control unit 330 allows a request issued from the processor 320 or the channel subsystem 340 to be stored in a queue temporarily and to be sent to the memory 310 with predetermined timing.

The channel subsystem 340 is connected with each of the controllers 350, and controls data transfer between the input/output device 360 and the memory 310 so as to reduce a processing load of the processor 320. Thereby, calculation processing by the processor 320 and input/output processing by the input/output device 360 can be performed in parallel, thus improving process efficiency.

The controller 350 controls timing or the like of data transfer by the input/output device 360. The input/output device 360 transfers data to/from the memory 310 via the controller 350, the channel subsystem 340, and the memory control unit 330. As the input/output device 360, a HDD, a display, a keyboard, a printer, a communication device and other storage device are available, and one of the input/output devices 360 is connected directly with the database 100 or is connected via the network 400.

In order to implement the search processing by the server device 300, a recording medium with a program recorded thereon is provided, and is connected with one of the input/output devices 360. Then, the program is sent to the memory 310 via the controller 350, the channel subsystem 340, and the memory control unit 330, and is stored to the memory 310. The stored program is installed in a HDD connected with the input/output device 360 via the same devices again, and is read out by the processor 320 appropriately for execution.

As the recording medium with the program stored thereon, a flexible disk, a CD-ROM, a DVD, a SD card, a flash memory or the like is available. This program includes a program for executing the search processing and outputting a search result. This program is installed in the same HDD, which is read out by the processor 320 appropriately for execution, thus implementing functions of a search engine.

Figure 6:
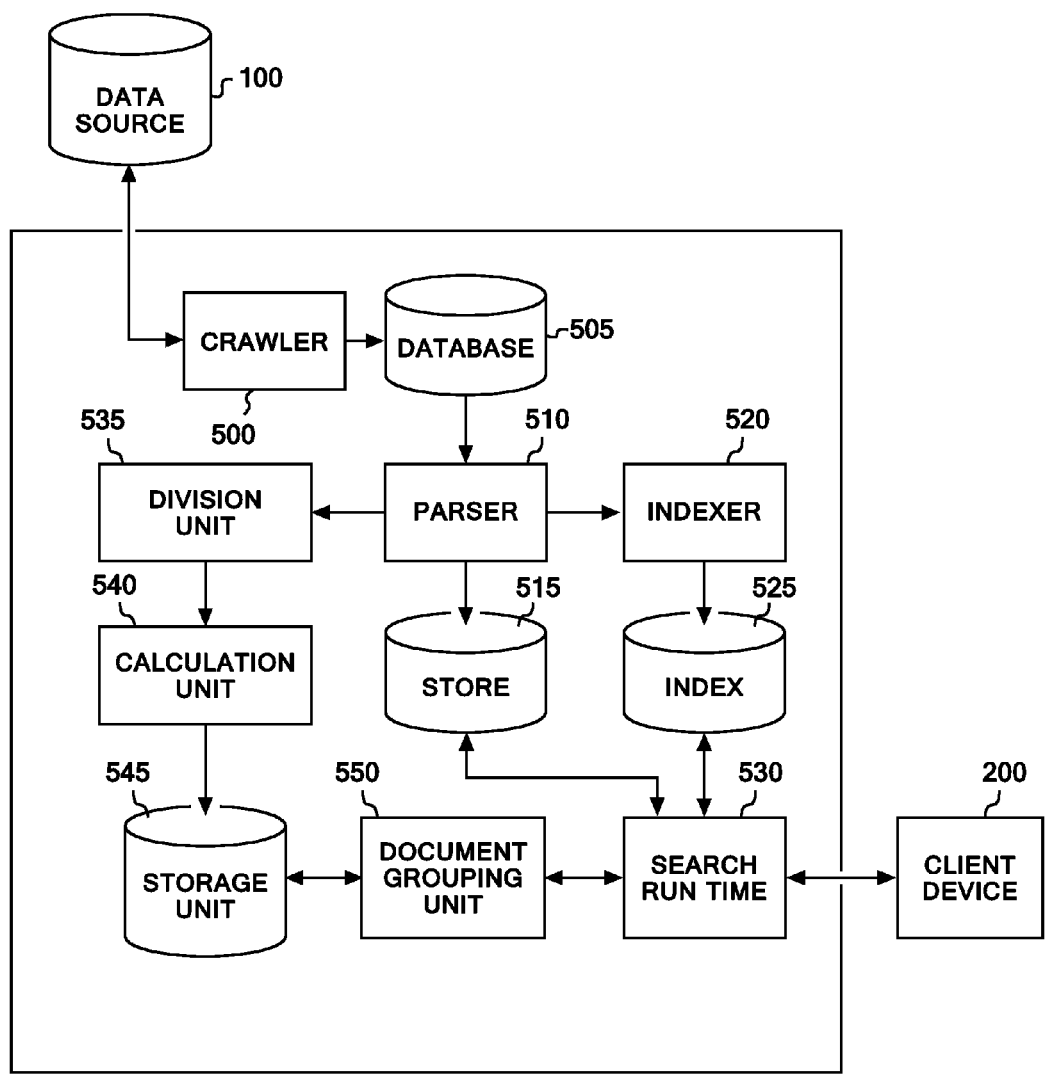
FIG. 6 is a functional block diagram showing that a server device is configured as a search system.

FIG. 6 is a functional block diagram showing that the server device 300 is configured as a search system. Similar to the conventional search engine illustrated in FIG. 3, this search system includes a crawler 500 as an acquisition unit that acquires a document periodically, a database 505 as a storage unit that stores an acquired document, a parser 510 as an extraction unit that extracts text from the document and extracts format information such as a paragraph, a store 515 as a storage unit that stores the extracted text and format information, an indexer 520 as a creation unit that creates an index from the text and format information, an index 525 as a keeping unit that keeps the created index, and a search run time 530 serving as a search unit that searches for a document including a search word as a key in response to a search request including the search word received from the client device 200.

Figures 2A, 2B:
FIGS. 2A and 2B illustrate an example of an inverted index for the documents illustrated in FIGS. 1A, 1B, and 1C, and a data structure to keep collected documents.
Figure 3:
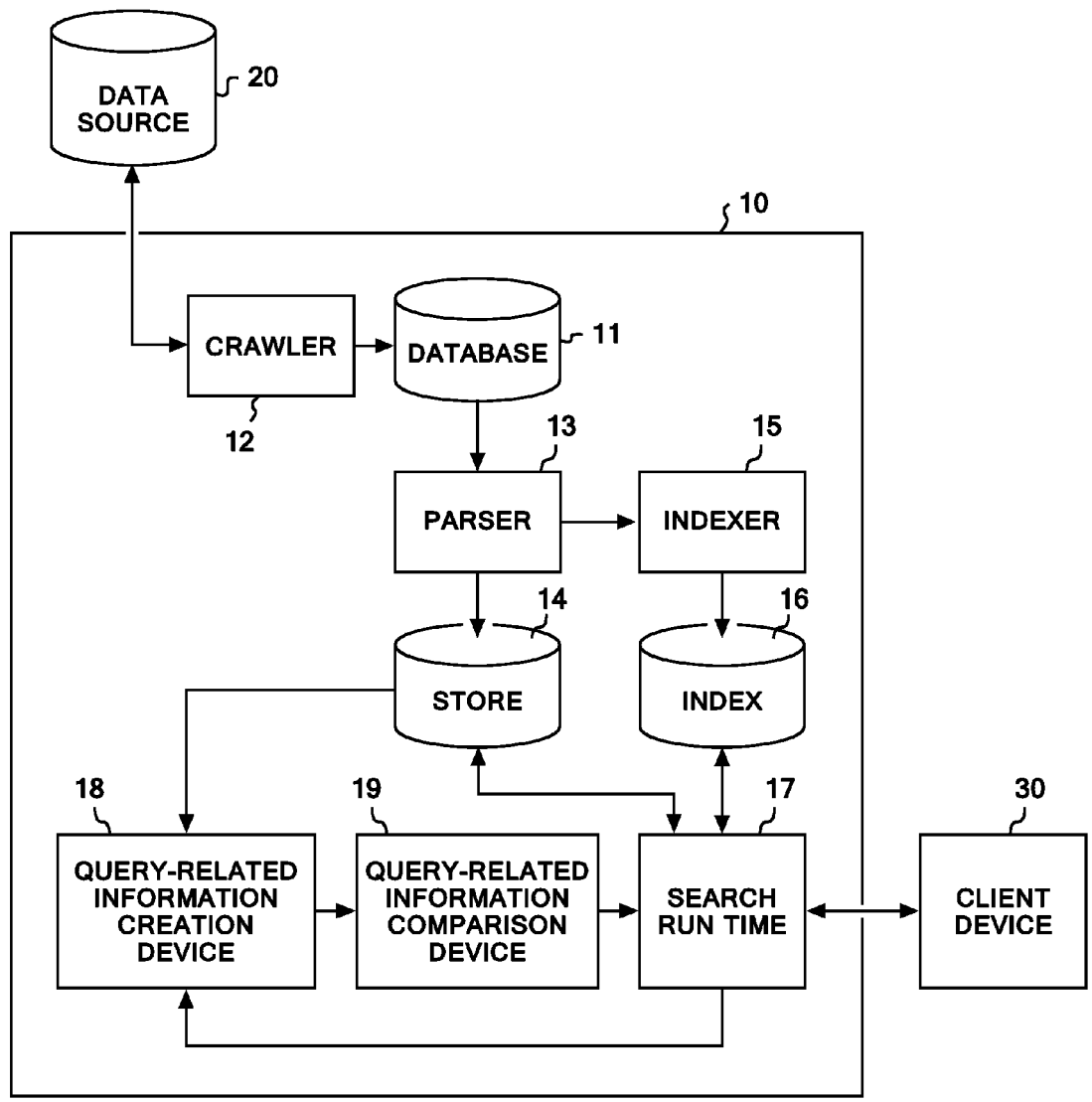
FIG. 3 illustrates an exemplary configuration of the conventional search engine.

The conventional search engine illustrated in FIG. 3 includes the query-related information creation device 18 and the query-related information comparison device 19. On the other hand, the search system illustrated in FIG. 6 includes a division unit 535, a calculation unit 540, a storage unit 545, and a document grouping unit 550.

Since each function of the crawler 500, the database 505, the parser 510, the store 515, the indexer 520, the index 525, and the search run time 530 has been described above, the following describes the division unit 535, the calculation unit 540, the storage unit 545, and the document grouping unit 550 in detail.

The division unit 535 receives text and format information extracted by the parser 510, and divides the text into a plurality of blocks in accordance with division information designated by a user. The division information shows how the text is to be divided, which may be selected from at least one of divisions into each sentence, into each paragraph, at a null line, and based on additional information added to a document. When each sentence is selected, the text will be divided into each sentence. A plurality of types of division information may be used. For instance, when a specific search word is used, division information for each paragraph may be used, and when another search word other than the specific search word is used, division information for each sentence may be used. A plurality of types of division information are set so that division can be made using such information, whereby when a user or a system judges that grouping using the division information for each sentence is not appropriate, then the division information for each paragraph may be used for grouping. In this way, division using a plurality of criteria is effective because it enables to adjust granularity of the grouping during a search. Herein, the additional information may include a HTML tag in a HTML document. Such division may be conducted when an index is created.

The calculation unit 540 calculates a hash value for each block by applying a hash function to a character string included in the block. The hash function generates a certain range of numerical values from data, and a hash value obtained by applying the hash function is a numerical value corresponding to each character string. The hash value may be calculated using a standard method for a Java® language, such as hashCode( ). Herein, hashCode( ) is a method to return a hash value.

One example of the hash function includes a function of adding a character code assigned to each character of the character string, e.g., a numerical value. The character code in this case may include an ASCII character code. The above-stated example is just one example, and any known calculation formula and algorithm may be used to find a hash value.

The storage unit 545 stores the hash value calculated by the calculation unit 540 together with positional information of the block in the document. The positional information of a block will be described below in detail.

For each document obtained by searching based on a search word, the document grouping unit 550 fetches a corresponding hash value from the storage unit 545 in accordance with positional information on a block including the search word. Then, the document grouping unit 550 groups documents having the same hash value and outputs the same as a search result. The thus output search result is sent to the search run time 530, and the search run time 530 returns the search result to the client device 200. When the Web browser receives the search result, the client device 200 makes the display device display the search result.

Referring now to FIGS. 7A to 11, the above processing will be described below in detail. FIGS. 7A to 7C illustrate three types of e-mail as document examples. All of these e-mail examples include a main body and a signature portion including a signature and the like, and there is a null line between the main body and the signature portion. Herein, "null line" is designated as division information, and the division unit 535 divides e-mail into two parts, i.e., the main body and the signature portion, at the null line based on the division information of the designated "null line". More specifically, after the crawler 500 acquires a document periodically and the parser 510 performs syntactic analysis of the document, the division unit 535 divides the document subjected to the syntactic analysis into a plurality of blocks.

Figure 8A:
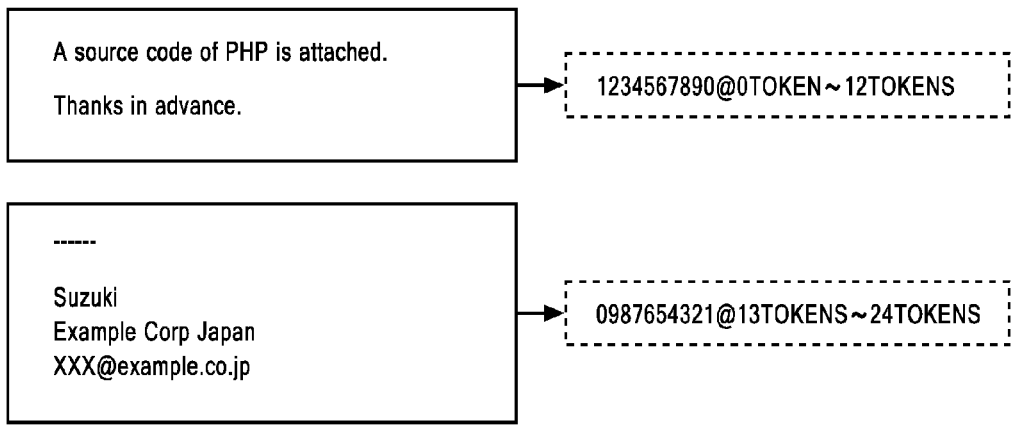
FIGS. 8A, 8B, and 8C each illustrate a state where a hash function is applied to a character string included in each of the divided blocks, and a hash value of each block is calculated.
Figure 8B:
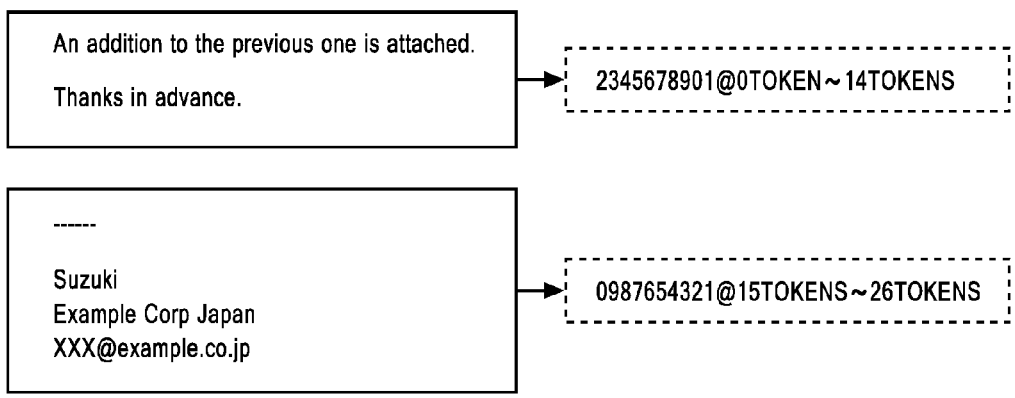
Figure 8C:
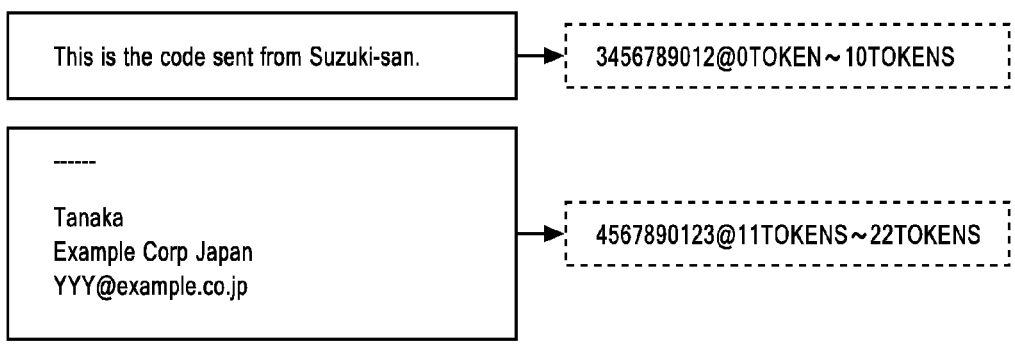
Figure 10A:
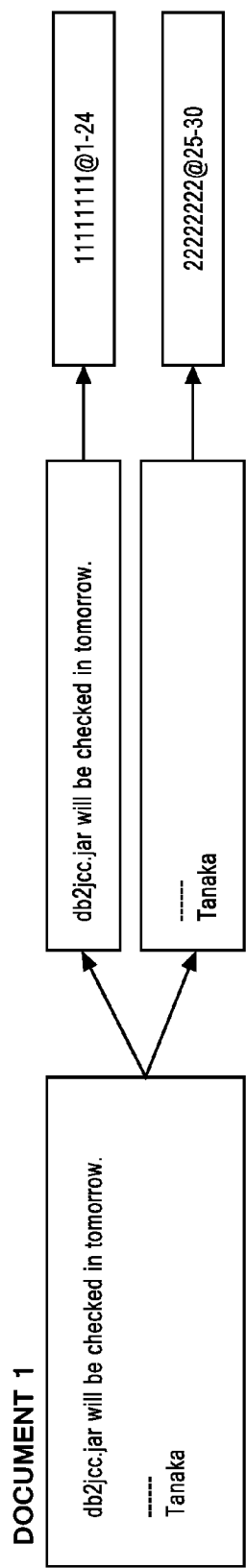
Figure 10B:
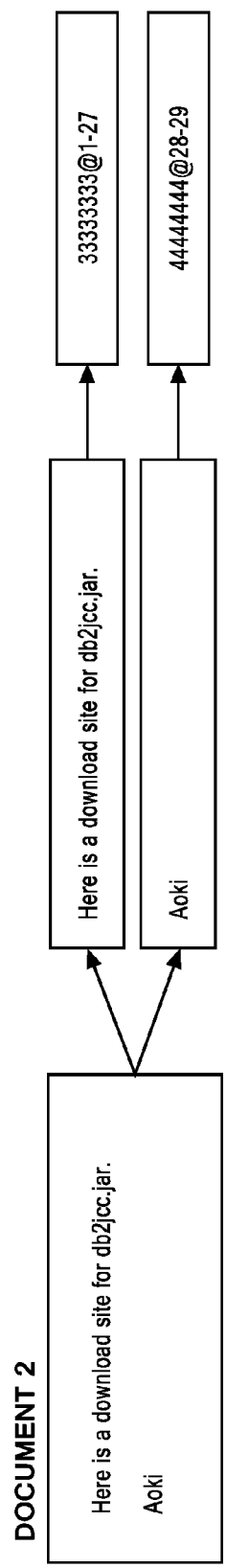

FIGS. 8A, 8B, and 8C each illustrate a state where a hash function is applied to a character string included in each of the divided blocks, and a hash value of each block is calculated. The parser 510 makes a character string included in each block a token (word with a space before and/or after the word) string. In FIG. 8A, there is a null line between the main body of "のソースコードを添付します。よろしくお願いします。" ("A source code of PHP is attached. Thanks in advance." in English) and the signature portion of "- - - 鈴木 Example Corp Japan XXX@example.co.jp" ("- - - Suzuki Example Corp Japan XXX@example.co.jp" in English), so that the null line divides the text into two token strings.

The calculation unit 540 calculates a hash value as a corresponding numerical value by applying a hash function to each token string. As for the above example, calculation based on "PHP のソースコードを添付します。よろしくお願いします。" ("A source code of PHP is attached. Thanks in advance." in English) leads to "1234567890", and calculation based on "- - - 鈴木 Example Corp Japan XXX@example.co.jp" ("- - - Suzuki Example Corp Japan XXX@example.co.jp" in English) leads to "0987654321". Herein, the hash values are calculated as 10-digit values, which is not a limiting example, and a value of any digit may be used.

Characters in the document are arranged from left to right in the direction of lines. When the line is finished, characters are arranged in the next line from left to right. Therefore, tokens in the document are arranged in the order from the token at the upper left corner to the token at the lower right corner. The positional information may include a token order from the leading token in the document to the leading token of a character string in each block. The position of the block may be represented, for example, by a range using this order and a token order from the leading token in the document to the end token of the character string included in each block. This range may be used as the positional information.

In the above-stated example
"PHP のソースコードを添付します。よろしくお願いします。" ("A source code of PHP is attached. Thanks in advance." in English), thirteen tokens of "PHP", "の", "ソースコード", "を", "添付", "し", "ます", "。", "よろしく", "お願い", "し", "ます", and "。" are included. Since "PHP" is the first token, this is 0 token. Since the final "。" is the thirteenth token, the positional information may be "0 token to 12 tokens". In FIG. 8A, these are combined using the mark of "@", and are represented as "1234567890@0 token to 12 tokens" and "0987654321@13 tokens to 24 tokens". The storage unit 545 stores such information.

In the above-stated example, the number of tokens from the leading token in the document to the leading token of each block is used as the token order to the leading token of each block. However, there is a case where the parser 510 actually generates a plurality of tokens from one word. For instance, six token may be generated from only five words so that a search can be made with a conjugated form of a word as well. On the other hand, the search system returns information indicating at what token number a hit occurs, and therefore the block fetched using the positional information calculated based on the number of tokens as stated above might be different from the correct one.

To cope with this, the following describes an example where the description of "PHP のソースコードを添付します。よろしくお願いします。" ("A source code of PHP is attached. Thanks in advance." in English) is divided into blocks by a sentence and positional information thereof is calculated. It is assumed that the parser 510 generates fifteen tokens of "PHP", "の", "ソースコード", "を", "添付", "し", "ます", "ました", "。", "よろしく", "お願い", "し", "ます", "ました", and "。". Herein, two tokens of "ました" are generated as conjugated forms (past form of "ます"), which are not included in the sentences actually. When the above description is divided for each sentence, the division unit 535 divides it into two blocks of "PHP のソースコードを添付します。" ("A source code of PHP is attached." in English) and "よろしくお願いします。" ("Thanks in advance." in English).

When the calculation unit 540 calculates a hash value and positional information, the calculation unit 540 calculates the number of tokens from the leading token obtained from the parser 510 as follows: the tokens of "ます" are not calculated as the seventh and the thirteenth tokens and the tokens of "ました" are not calculated as the eighth and the fourteenth tokens, instead the adjacent tokens "ます", and "ました" are arranged in parallel so that they are collectively calculated as the seventh and the twelfth tokens.

Then, as for the block of "PHP のソースコードを添付します。" ("A source code of PHP is attached." in English), the calculation unit 540 uses the order to the leading token of the block and the order to the end token to calculate "hash value @0 to 7", and as for the block of "よろしくお願いします。" ("Thanks in advance." in English), similar orders are used to calculate "hash value @8 to 12", and the calculated values are stored in the storage unit 545.

As long as a token string does not change, the calculated hash value will be always the same. Whereas, when even one token is different, a different hash value will be obtained. Referring to FIGS. 8A and 8B, since a part of the tokens are different in the main bodies, their hash values have different values "1234567890" and "2345678901". Whereas, since all of the tokens are the same in the signature portions, they have the same hash value "0987654321". In FIG. 8C, both of the main body and the signature portion are at least partially different from those in FIGS. 8A and 8B, the hash values thereof are different from those of FIGS. 8A and 8B.

A token consisting of a mark of a specific character type may be excluded from the hash calculation. Thereby, as for character strings of "こんにちは" ("Hello" in English) and ">ました", the same hash value can be calculated since they are different only in the portion of the mark ">", but the portion of "ました" are common thereto. This mark ">" is generally added when the contents of e-mail are quoted. Therefore, even when the contents of the received e-mail are quoted and the mark ">" is added thereto, the same hash value can be obtained as long as the other tokens are arranged in the same way. This is effective for searching e-mail. The above-described processing may be performed when an index is created. Herein, character types excluded at the time of calculation of a hash value are not limited to ">" and ">>" that are added when the contents are quoted in e-mail, and any character type may be designated by a user beforehand, whereby calculation is performed with the designated character type excluded.

When the client device 200 outputs a search request, the search run time 530 searches for, based on a search word included in the search request, an index created by the indexer 520 from the index 525, and acquires text and format information of a document obtained by search from the store 515. The search run time 530 passes such information to the document grouping unit 550.

The document grouping unit 550 fetches a hash value of a block including a hit token for each document of the search result from the storage unit 545 based on positional information of the block including the search word, and groups documents having the same hash value as one group.

When a search is executed based on the input search word, the search run time 530 returns a result indicating a sequence number of a hit token. Herein, since the calculation unit 540 calculates sequence numbers of tokens in a token string as positional information and the storage unit 545 stores the positional information, the document grouping unit 550 fetches a hash value based on the sequence number of the token returned from the search run time 530, thus allowing a correct hash value to be fetched.

The division unit 535 divides a document including a plurality of token strings into a plurality of blocks, the calculation unit 540 calculates each hash value based on the token string included in each block, and the storage unit 545 stores the calculated hash values. When the search word is included in two or more blocks, hash values calculated based on the token strings included in those two or more blocks may be added up to provide a hash value of the document, which is then stored.

When the user inputs a search word of "鈴木" ("Suzuki" in English) through the client device 200 and submits a search request therefor, the search run time 530 searches the index 525 to obtain the three documents illustrated in FIGS. 8A to 8C as a search result. The documents illustrated in FIGS. 8A to 8C are referred to as documents 1 to 3, respectively. In document 1, the search word "鈴木" ("Suzuki") is at the fifteenth token, and a hash value of the block including the token is "0987654321". In document 2, the search word "鈴木" ("Suzuki") is at the seventeenth token, and a hash value of the block including the token is "0987654321", which is the same as that of the above document 1. Therefore, documents 1 and 2 are grouped into the same group.

In document 3, the search word "鈴木" ("Suzuki") is at the first token, and a hash value of the block including the token is "3456789012", which is different from those of documents 1 and 2. Therefore, document 3 is grouped into a group different from that of documents 1 and 2.

The grouped documents may be displayed as a search result in any display format as long as it shows that the documents are included in a certain group. For instance, they may be displayed as illustrated in FIG. 9B. In the search result illustrated in FIG. 9B, the first document of the documents grouped into the same group is displayed normally, and the second and subsequent documents are indented to the right with a vertical bar added at the beginning thereof. Thereby, the user can judge a relationship between the documents of the search result at a glance. Herein, the display of the grouped documents is not limited to the above style using a vertical bar and indenting, and the relationship may be shown by changing a character type, adding an identification mark, or the like.

The grouped documents are arranged based on a search score. The search score may be obtained as follows. A value representing how many documents include a search word among all of the documents is calculated from the number of documents including the search word and the number of all documents, and the calculated value and the number of occurrences of the search word are multiplied, thus obtaining the search score. Therefore, a document with a larger number of occurrences has a higher score, and a document with a smaller number of occurrences has a lower score.

For comparison with FIG. 9B, FIG. 9A illustrates a result of the conventional search without grouping by the search run time 530 based on the search word of "鈴木" ("Suzuki" in English). In the search result illustrated in FIG. 9A, a user has to evaluate each of the search results, whereas in the search result illustrated in FIG. 9B, a user can judge which results are overlapped at a glance, so that just one of them can be evaluated, thus making it easy to find out a necessary document.

In the embodiment described so far, the positional information of the block is represented using the order of the tokens. However, the way of representing the positional information is not limited to using the order of the tokens, and it may be represented using the order of characters aligned. FIGS. 10A to 10D illustrate four examples of e-mail, each of which is divided into blocks, with a hash value and positional information being associated with each other.

The examples illustrated in FIGS. 10A, 10B, 10C, and 10D are also divided into blocks at null lines by the division unit 535. Documents 1 and 2 illustrated in FIGS. 10A and 10B, respectively, are divided into two parts which are a main body and a signature portion. Documents 3 and 4 illustrated in FIGS. 10C and 10D, respectively, are divided into four and six parts, respectively, including a plurality of main body portions and signature portions with marks ">" and ">>" being added to quoted sentences and signatures.

The calculation unit 540 calculates a hash value from a character string included in each block, uses, as positional information, a range represented using the number of characters from the leading character of the document to the leading character of the character string and the number of characters from the leading character of the document to the end character of the character string, and stores the positional information and the hash value in the storage unit 545 in an associative manner. Referring to the document illustrated in FIG. 10A, it is divided into "db2jcc.jar を明日、チェックインします。" ("db2jcc.jar will be checked in tomorrow." in English), which is a main body, and "- - - 田中" ("- - - Tanaka" in English), which is a signature, and "11111111" is calculated for the main body and "22222222" is calculated for the signature. Since there is no character preceding the main body, it starts from the first character and the number of the characters is twenty four, and the positional information is "1 to 24". Since the signature starts from the twenty-fifth character, and the number of characters is six, the positional information is "25 to 30".

In response to the search request from the client device 200, the search run time 530 searches for a document from the index 525. Herein, "db2jcc.jar" is input as a search word. The search run time 530 searches for a document including this "db2jcc.jar", and passes a search result to the document grouping unit 550. The document grouping unit 550 groups documents, each having a block which includes "db2jcc.jar" and has the same hash value, into one group. In this embodiment, since documents 1, 3, and 4 have the same hash value of "11111111", the document grouping unit 550 groups these documents into the same group. Since in document 2 the block including "db2jcc.jar" has a different hash value of "33333333", the document grouping unit 550 groups document 2 into a different group.

The document grouping unit 550 returns the search result subjected to the grouping to the search run time 530, and the search run time 530 sends the search result to the client device 200. FIGS. 11A and 11B illustrate one example of the search result subjected to the grouping. As can be seen at a glance of the search result, the second and subsequent documents belonging to the same group are indented. In FIGS. 11A and 11B, documents 1, 3, and 4 are grouped into the same group, and document 2 is grouped into a different group.

According to the present invention, a document to be searched is divided into a plurality of blocks, a hash value is calculated based on a character string included in each block, and the calculated hash value is stored in association with positional information of the block. Thus, memory usage is increased by the amount corresponding to the storage of the hash value and the positional information. A significant increase in the memory usage would lower the processing speed of a processor greatly.

Therefore, we investigated how much memory usage increased. A mail corpus including 11,830 stored documents (e-mail) and 512,127 sentences was used as a data source. Document division was performed on a sentence basis, each hash value had an 8-byte length, and a token number representing the order from the leading token of a document to the leading token of a sentence and a token number representing the order from the leading token of the document to the end token of the sentence were used as positional information.

Under these conditions, the memory usage for storing an index was 93,995,008 bytes when only the index was stored without the hash values, and was 98,820,096 bytes when the hash values were stored in addition to the index in the present invention. This means an increase of 9.42 bytes for each sentence, and the memory usage simply increased by about 5%. Therefore, it can be considered that the memory usage does not increase greatly, so that the processing speed of the processor is not affected.

Documents to be searched may be any documents as long as text can be extracted therefrom, including a text file, an office document, e-mail and the like. Note here that as long as documents have the same text extracted and division information, it is possible to determine whether the documents are related to each other or not even when they have different formats. Therefore, division into blocks has to be performed in the same way. This is because a different way of dividing causes a change in a judgment for related documents.

Information that the search system has to have for each document includes the above-stated token strings making up the document and division information indicating how the document is to be divided as well as identification information of the document (e.g., document number) and character information to be included in a hash value, for example. The parser 510 receives the token string and the identification information of the document, the division unit 535 keeps the division information, and the calculation unit 540 keeps the character information to be included in the hash value.

The information stored at the time of creation of an index and used for a search may include a hash value and positional information of a block as well as identification information of a document. The storage unit 545 stores such information, and the document grouping unit 550 reads the same.

While the search system and the search method executed by the search system of the present invention have been described in detail, the present invention is not limited to the above-described embodiments, and another embodiment, addition, change and deletion are all possible as long as they are within the range obvious to those skilled in the art. Any embodiment will be within the scope of the present invention as long as the effects of the present invention can be obtained therefrom. Thus, the present invention may be configured as a program that is readable by a computer, and the present invention can be embodied as a search system by making the computer execute the program. The program may be provided by storing it in a recording medium.

What is claimed:

1. A search system, comprising:
a processor; and
storage coupled to the processor, wherein the storage store a program, and
wherein the processor is configured to execute the program to perform operations, wherein the operations comprise:
dividing each document of a plurality of documents into a first plurality of blocks using a first type of division information;
dividing each document of the plurality of documents into a second plurality of blocks using a second type of division information that is different from the first type of division information;
storing a hash value for each block of the first plurality of blocks and each block of the second plurality of blocks;
determining whether a search word is to be processed using the first type of division information or the second type of division information;
in response to determining that the search word is to be processed using the first type of division information, fetching a corresponding hash value for one or more blocks of the first plurality of blocks divided using the first type of division information and including the search word and grouping documents having a same hash value into one group;
in response to determining that the search word is to be processed using the second type of division information, fetching a corresponding hash value for one or more blocks of the second plurality of blocks divided using the second type of division information and including the search word and grouping documents having a same hash value into one group; and
outputting the grouped documents as a search result.

2. The search system according to claim 1, wherein a document from the plurality of documents is divided into at least two of: into each sentence, into each paragraph, and at a null line.

3. The search system according to claim 1, wherein a document from the plurality of documents includes a token string in which a plurality of words or tokens are sequentially ordered, and positional information on each block of the plurality of blocks includes a token order from a leading token in the document to a leading token of each block.

4. The search system according to claim 1, wherein positional information on a block of the plurality of blocks includes a number of characters from a leading character in a document from the plurality of documents to a leading character of the block.

5. The search system according to claim 1, wherein, when a character string included in a block in the plurality of blocks includes a designated character type, the hash value is calculated by applying the hash function to the character string from which the character type has been excluded.

6. The search system according to claim 1, wherein the operations further comprise:
sorting a plurality of documents included in a group in accordance with a search score.

7. The search system according to claim 1, wherein the operations further comprise:
displaying a first document in the one group in a first format while displaying subsequent documents in the one group in a different format to illustrate a relationship between the first document and the subsequent documents.

8. A search method, comprising:
dividing each document of a plurality of documents into a first plurality of blocks using a first type of division information;
dividing each document of the plurality of documents into a second plurality of blocks using a second type of division information that is different from the first type of division information;
storing a hash value for each block of the first plurality of blocks and each block of the second plurality of blocks;
determining whether a search word is to be processed using the first type of division information or the second type of division information;
in response to determining that the search word is to be processed using the first type of division information, fetching a corresponding hash value for one or more blocks of the first plurality of blocks divided using the first type of division information and including the search word and grouping documents having a same hash value into one group;
in response to determining that the search word is to be processed using the second type of division information, fetching a corresponding hash value for one or more blocks of the second plurality of blocks divided using the second type of division information and including the search word and grouping documents having a same hash value into one group; and
outputting the grouped documents as a search result.

9. The search method according to claim 8, wherein the dividing and the storing are executed when an index used by the search system during a search is created, and the outputting is executed at a time of the search.

10. The search method according to claim 8, wherein a document from the plurality of documents is divided into at least two of: into each sentence, into each paragraph, and at a null line.

11. The search method according to claim 8, wherein a document from the plurality of documents includes a token string in which a plurality of words or tokens are sequentially ordered, and positional information on each block of the plurality of blocks includes a token order from a leading token in the document to a leading token of each block.

12. The search method according to claim 8, wherein positional information on a block of the plurality of blocks includes a number of characters from a leading character in a document from the plurality of documents to a leading character of the block.

13. The search method according to claim 8, wherein, when a character string included in a block in the plurality of blocks includes a designated character type, the hash value is calculated by applying the hash function to the character string from which the character type has been excluded.

14. The search method according to claim 8, wherein the outputting further comprises:
sorting a plurality of documents included in a group in accordance with a search score.

15. A computer readable program stored in a non-transitory recording medium and executed by a processor of a search system, the computer readable program, when executed by the processor, performing:
dividing each document of a plurality of documents into a first plurality of blocks using a first type of division information;
dividing each document of the plurality of documents into a second plurality of blocks using a second type of division information that is different from the first type of division information;
storing a hash value for each block of the first plurality of blocks and each block of the second plurality of blocks;
determining whether a search word is to be processed using the first type of division information or the second type of division information;
in response to determining that the search word is to be processed using the first type of division information, fetching a corresponding hash value for one or more blocks of the first plurality of blocks divided using the first type of division information and including the search word and grouping documents having a same hash value into one group;
in response to determining that the search word is to be processed using the second type of division information, fetching a corresponding hash value for one or more blocks of the second plurality of blocks divided using the second type of division information and including the search word and grouping documents having a same hash value into one group; and
outputting the grouped documents as a search result.

16. The program according to claim 15, wherein the dividing and the storing are executed when an index used by the search system during a search is created, and the outputting is executed at a time of the search.

17. The program according to claim 15, a document from the plurality of documents is divided into at least two of: into each sentence, into each paragraph, and at a null line.

18. The program according to claim 15, wherein, when a character string included in a block in the plurality of blocks includes a designated character type, the hash value is calculated by applying the hash function to the character string from which the character type has been excluded.

19. The program according to claim 15, wherein, when outputting, the computer readable program, when executed by the processor, further performs:
sorting a plurality of documents included in a group in accordance with a search score.

20. The program according to claim 15, wherein a document from the plurality of documents includes a token string in which a plurality of words or tokens are sequentially ordered, and positional information on each block of the plurality of blocks includes a token order from a leading token in the document to a leading token of each block.

21. The program according to claim 15, wherein positional information on a block of the plurality of blocks includes a number of characters from a leading character in a document from the plurality of documents to a leading character of the block.

* * * * *